Oct. 24, 1961 E. L. HARDER 3,005,589

SIMPLIFIED ANALOG DISPATCH COMPUTER

Filed Oct. 29, 1957 2 Sheets-Sheet 2

United States Patent Office 3,005,589
Patented Oct. 24, 1961

3,005,589
SIMPLIFIED ANALOG DISPATCH COMPUTER

Edwin L. Harder, Pittsburgh, Pa., assignor to Westinghouse Electric Corporation, East Pittsburgh, Pa., a corporation of Pennsylvania Filed Oct. 29, 1957, Ser. No. 693,099
5 Claims. (Cl. 235—185)

Figure 1:
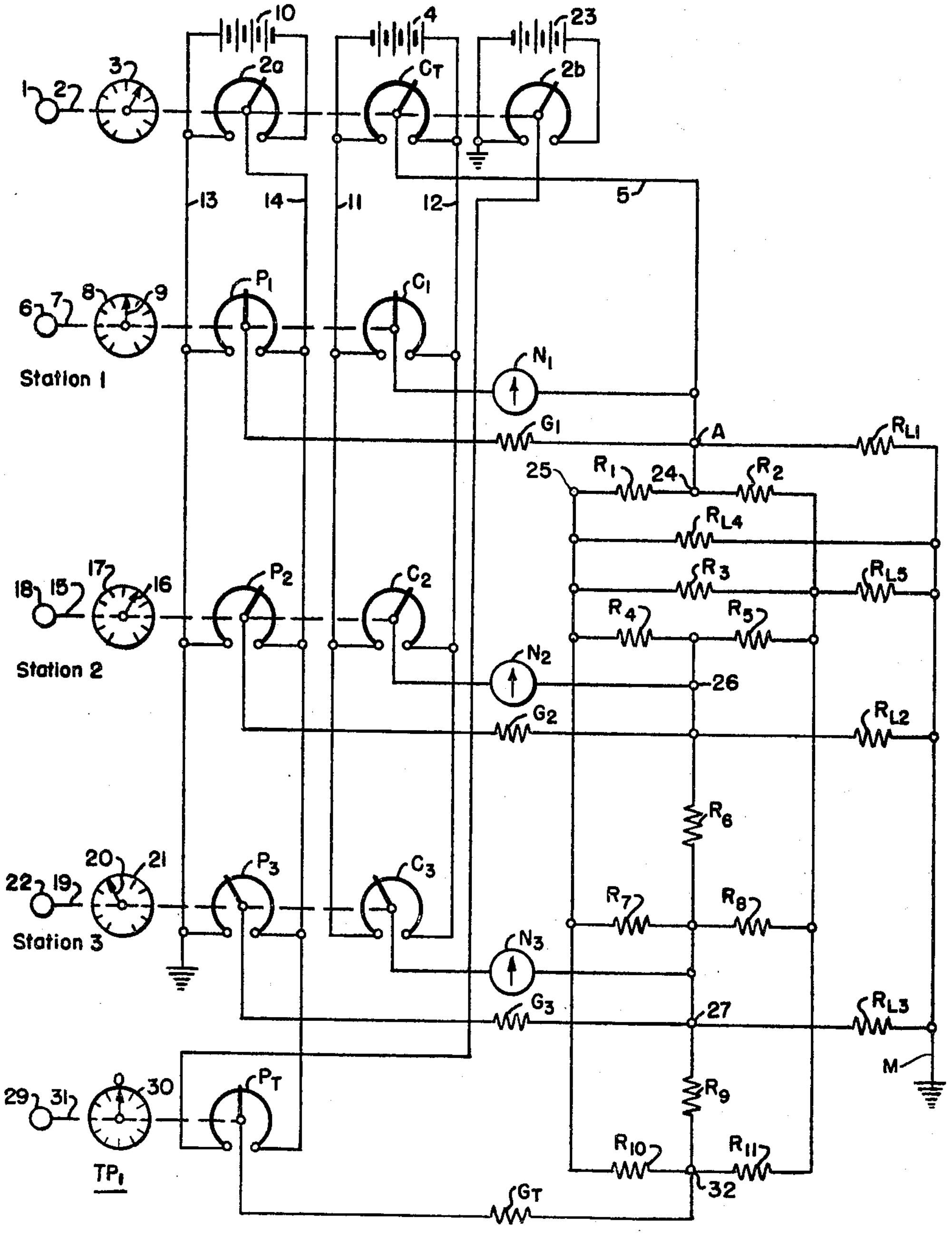

This invention relates generally to simplified analog computers and more particularly to an analog type of computer capable of solving the economic dispatch of power among stations of a power system.

Such systems generally include a plurality of interconnected electric power generating stations forming a basic electrical network, having connections to various loads sometimes including tie-line connections with adjoining power systems. A computer of the type to be explained herein, serves a purpose of providing the most economical method of dividing the total load among a plurality of generating stations in the system.

It has been the general practice in computers of this nature to solve for the condition of equal incremental delivered power cost to the load from every variable generating station, including the two incremental cost factors of (*a*) incremental production cost of the generating station, and (*b*) cost of incremental transmission loss between each station and the load. It has been proved that when incremental delivered power costs are equal from all variable stations, the lowest cost of operation exists. Computers of this nature necessarily become complex since it is necessary to provide a matrix of incremental transmission loss coefficients, $n^2$ in number where $n$ is the number of generating and tie stations. All $n^2$ values must be changed to represent a change in the transmission system. This is such a major operation that in practice, the coefficients are changed only once or twice a year, when a number of transmission changes have accumulated. It is not feasible to follow transmission changes daily as they occur, and as is desired.

It is therefore an object of this invention to provide an analog dispatch computer of a greater simplified arrangement capable of producing satisfactorily dispatching results.

It is another object of this invention to provide an analog dispatch computer having a loss resistor of the proper value placed in the computer system in a position corresponding to each transmission line in the actual transmission system.

It is another object of this invention to provide a simplified analog dispatch computer that is readily modified to include any changes in the power system associated therein.

It is another object of this invention to provide an economic dispatch computer having a reference point selected in the computer corresponding to a point in the system to which all stations are balanced to have the same incremental delivered power cost.

It is another object of this invention to provide an economic dispatch computer capable of eliminating the necessity of adjusting all stations in the computer to the same average incremental delivered power cost directly.

Other objects, purposes, and characteristic features will become clear as the description of this invention progresses.

As contracted with the "equal incremental delivered power cost" principle of the computers requiring an $n^2$ matrix of loss resistors, this computer will be based on another principle as follows. When the incremental production cost ratio for each pair of generating stations is equal to the incremental fraction of power delivered (i.e. 1–1/1 loss) from the lower cost to the higher cost station, the economic dispatch exists. For example, if 90% of incremental power transmitted from station 1 to station 2 reaches station 2, then station 1 should be operating at 90% of the incremental production cost of station 2 to be in economic balance. It can be shown that this condition also is a necessary and sufficient condition for minimum operating cost. In particular, all generating stations can be related to any one point of the system, as for example a principal generating bus. As a first approximation, with power factor and voltage both taken as one per unit, i.e. 100%, current and power are the same in per unit. The loss in a line connecting two stations is $I^2R$.

$$\frac{I^2R}{I}=IR\ 1/1$$

of power transmitted. The incremental loss $$\frac{d}{dI}(I^2R)$$

is 2IR per unit of power transmitted. A line having $I^2R$ of 5% of transmitted power, has incremental loss of 10% of incremental transmitted power. Thus, 1–2IR is a close approximation to the fraction of incremental power delivered. This relationshoip between the incremental loss 2IR and the voltage drop IR is made the basis of an analog computer in which the voltage drops corresponding to the power flow also becomes the increases of incremental production cost as we proceed through the system network from station to station. The incremental production costs are also represented as D.-C. voltages but in reverse sense, and the scaling is arranged so that the same network represents power flow and required incremental production cost for economic operation.

As shown above when power is transmitted from one station to another in a system as substantially constant voltage, E, and with substantially unity power factor:

The power is $P=EI$ ------------- 1/1 of base values.
The loss is $L=I^2R$ --------------- 1/1 of base values.
The incremental loss is 2IR -------- 1/1 of base values.
Or the incremental loss is $$\frac{2PR}{E}$$

------------------------------- 1/1 of base values.

The expression $$\frac{2PR}{E}$$

is made the basis for the following approximate economic dispatch computer in which changes can be readily made to correspond with system changes.

It is necessary to operate a system so that delivered power over each line of the system produces a 1/1 incremental transmission loss from any station 1 to any other station 2 such that the fraction of transmitted power reaching station 2 equals the ratio of incremental production costs.

From the above equation $$\frac{2PR}{E}$$

representing the fraction of incremental transmitted power loss, let $E=1$ then the equation becomes 2PR.

Let $F_1(P_1)$ be the incremental production cost of station 1 and $F_2(P_2)$ be the incremental production cost at station 2 and let $P_{1-2}$ be the transmitted power then if $F_2(P_2)\ (1-2RP_{1-2})=F_1(P_1)$ this system is in economic balance.

In practicing this invention, there is provided an economic dispatch computer of the simplified form for a distribution system having the network of a plurality of stations capable of taking the incremental cost of producing power at each station in the system, and a value representing the total power of each station in the system and interconnecting the total output of each of the stations into a network of transmission loss resistors in such a manner that at a selected point in the system the cost of providing one unit of power from each of the stations in the system is the same. With this impedance network, it is possible to refer the incremental costs of producing power at each station to the system reference point, and thus adjust the output power of each station to produce a balance of the unit cost at the reference point. With this arrangement, the systems and each station in the system is then said to be in an economic balance condition.

Figure 2:
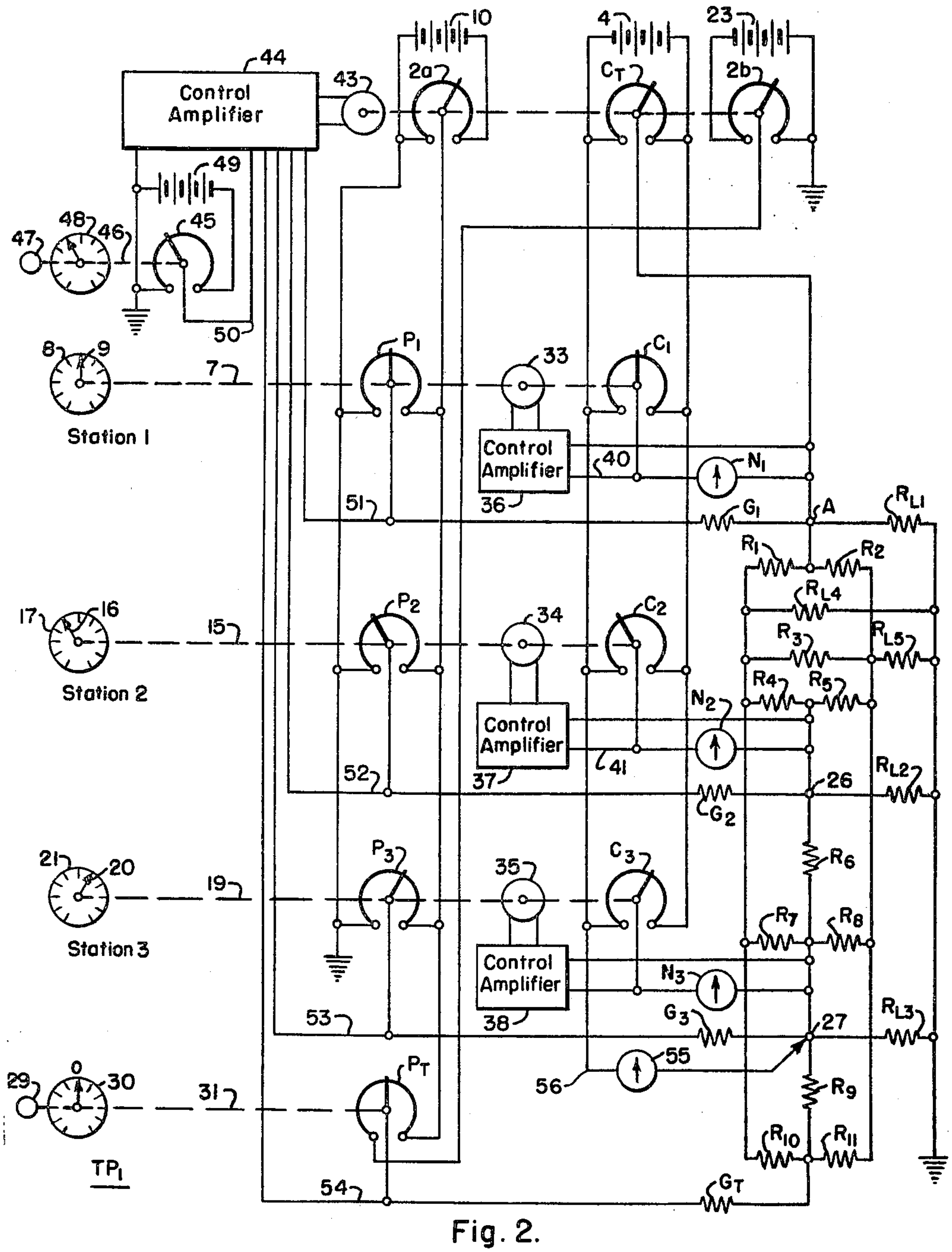

FIGURE 1 is a schematic view of a simplified dispatch computer capable of providing the economic power dispatch of an associated system; and FIG. 2 is a schematic view of a servo controlled economic dispatch system capable of displaying automatically, the economic dispatch of power within a system associated therewith.

In each of the views, similar parts bear like-reference characters.

The simplified computer of FIGURE 1 is a computer that is manually controlled for the purpose of indicating the most economical dispatch of power for each station in a power network. Since the computer can be constructed to have its reference point at any desirable point in the system, the computer of FIGURE 1 has been selected to have station 1 bus point A as the reference in the system at which point, a unit of power delivered from any variable station in the system costs the same. The potentiometer $C_T$ may be a non-linear potentiometer similar to that described in the analog computer case Serial No. 556,149 filed December 29, 1955, invented by Edwin L. Harder and assigned to the common assignee. The potentiometer $C_T$ is provided with a manual control knob 1 and interconnected mechanical link 2 having secured thereto an indicator 3 divided into segments indicating the power generated by unit 1, and two additional potentiometers 2*a* and 2*b* necessary to satisfy the load requirements of the system. The potentiometer $C_T$ is also provided with a source of voltage 4 connected thereacross to develop a voltage across the potentiometer to be delivered to the conductor 5 with respect to conductor 11 for a purpose, to be described hereinafter. The potentiometers 2*a* and 2*b* provide a means of delivering a voltage to each station that is proportional to the system needs to be explained hereinafter.

Similarly, station 1 is provided with a manual control knob 6 and a mechanical linkage 7 interconnecting a power indicating dial 8 pointer 9, a potentiometer $P_1$ representing the power output of station 1 and an incremental costs potentiometer $C_1$. With the two potentiometers $P_1$ and $C_1$ tied together and connected to the pointer 9 of the power indicator 8 and the manual control knob 6, it can be seen that a rotation of the manual control knob 6 and its mechanical link 7 displacing the potentiometer $P_1$, representing the total output power of station 1, also changes the value of the incremental cost of producing the power at station 1. Power potentiometer $P_1$ at station 1 is provided with a battery or other suitable source of power 10 connected thereacross through the potentiometer 2*a* to produce a voltage on the variable potentiometer $P_1$ representative of the total power produced by the station. Likewise, the potentiometer $C_1$ is connected across the previously mentioned source of power 4 by the conductors 11 and 12. Potentiometers $C_1$ like $C_T$ may be, if necessary, a non-linear type of device capable of producing output voltages representative of the incremental worth of delivered power at station 1. Stations 2 and 3 of this disclosed three-station network are provided with the potentiometers $P_2$ and $P_3$ respectively, also connected across the source of power 10 by the potentiometer 2*a* and the conductors 13 and 14, so that the voltages received from the variable taps of the potentiometers $P_2$ and $P_3$ represent the total power output of the stations 2 and 3, respectively. Like station 1, stations 2 and 3 are provided with a potentiometer indicating the value or incremental cost value of producing power at each of these stations. These are designated $C_2$ and $C_3$ respectively. Station 2 like that of station 1, has its two potentiometers, $P_2$ and $C_2$, interconnected by a mechanical link 15 which is also connected to a pointer 16 of a power indicator dial 17 and a mechanical hand knob 18 for providing a means of rotating the mechanical link 15 and its connected indicator pointer 16 and its potentiometer $P_2$ and $C_2$. It is also pointed out that $C_2$ is connected across the source of power 4 by the conductors 11 and 12. Station 3 has its power producing potentiometer $P_3$ and its incremental worth of delivered power potentiometer $C_3$ interconnected by a mechanical link 19 which also carries a pointer 20 of a power indicating dial 21. The mechanical link 19 is also provided with a hand rotating knob 22 capable of changing the position of the variable taps of the power potentiometer $P_3$ and the potentiometer $C_3$ in a manner similar to that previously described.

Similar to the previously mentioned stations 1 and 2, the conductors 13 and 14 serve to connect the potentiometer $P_3$ of station 3 across the source of voltage 10 through the potentiometer 2*a*. Likewise, the conductors 11 and 12 serve to connect the potentiometer $C_3$ across the source of voltage 4, in a manner similar to the C potentiometers in stations 1 and 2. The remaining power-producing or consuming point in the system is the tie-point called $TP_1$. Since the tie-point is a point of which power may be delivered from the system to an adjacent system or act to receive power from an adjacent system and thus supply the power to its associated system, it is only necessary to provide a means of indicating total power means supplied or received between this system and the adjacent system. For this purpose, we provide the potentiometer $P_T$ connected across the source of power 10 and an additional source of power 23 connected in series. If we assume that the source of power 10 is equal in potential to the source of power 23 and with the two sources connected in series across a power potentiometer $P_T$, that with the potentiometer in its center or neutral position, an indication of zero power supply or delivery through the tie-point would be represented. This source 10 and 23 arrangement with the potentiometer 2*a* and 2*b* allows the system unit potential to be varied without affecting the tie-power representation set by potentiometer $P_T$. The battery 10 is connected across the potentiometer 2*a*, the battery 23 is connected across the potentiometer 2*b* and the wiper arm of the potentiometer 2*a* is connected to one side of the potentiometer $P_T$ which the wiper arm of the potentiometer 2*b* is connected to the other side of the potentiometer $P_T$.

In order to represent the power generated, the power used and the power lost in the system, the network of resistances interconnecting the previously described potentiometers is provided. In order to provide a simplified system capable of ignoring minor variables in the system for the purpose of producing a computer that is simple in structure, it is necessary to proportion the network resistances in such an arrangement that the ignored variables become minor factors in the computing system. For this reason the current generating resistances $G_1$ and $G_2$ and $G_3$ connecting the power output tap members of the potentiometers $P_1$, $P_2$, and $P_3$ respectively to their loads $RL_1$ and $RL_2$, and $RL_3$, respectively, as well as network loads, are made of very high resistance so that currents flowing will be proportional to the voltages developed between pointers of potentiometers $P_1$, $P_2$ and $P_3$, and common point M, as limited only by current generating resistors $G_1$, $G_2$ and $G_3$, respectively.

Since the loads of the network are not necessarily located adjacent to the generating stations, the loads $RL_4$ and $RL_5$ have been included to represent loads taken from the transmission lines at points between generating stations. Each of the resistors $R_1$ through $R_{11}$ represent line loss resistances for the transmission lines in the system. Each resistor $R_1$ through $R_{11}$ is an actual representation of a transmission line in the system and for this reason it is simple to change the operation of the computer to agree with the system if the system should be modified by the removal or the addition of a transmission line between any two points in the system. For example, if the transmission line between point 24 and point 25 in the system was to be removed, an elimination of resistor $R_1$ within the computer would also be necessary. It can be seen that power delivered by stations 1, 2 and 3 to the network of resistors representing the transmission system and loads, are provided with parallel return paths through the parallel transmission lines and parallel loads. For example, power delivered to point A by station 1 has a return path through a load resistor $RL_1$ as well as a parallel return path through the transmission lines represented by the loss resistor $R_1$ to point 25 through the load $RL_4$, a transmission line represented by the loss resistor $R_2$ and through load $RL_5$ as well as additional paths through other transmission lines such as those represented by the loss resistors $R_4$ and $R_5$ and through other load resistors such as $RL_2$.

A typical operation of the system will now follow:

If the operator of this computer determines and adjusts the manual control knob 1 to the incremental cost of power setting necessary for the system, the incremental cost potentiometer $C_T$ assumes the condition dictated by manual control knob 1, and thus delivers a voltage with respect to bus 11 through the conductor 5 to point A of the system network. Since point A is the point of which station 1 delivers its representative power to the network, the operator will observe the nullmeter $N_1$ connected between the $C_1$ potentiometer and point A to determine the direction and the amount of adjustment necessary to provide adequate power output from station 1. Adjustment of the knob 1 also adjusts the potentiometers 2a and 2b to provide a critical proper voltage supply to the potentiometers $P_1$ through $P_T$. If the operator observes the nullmeter $N_1$ in a position indicating unbalance, the manual control knob 6 is rotated until the null $N_1$ is again at zero, or a balanced condition. As the manual control knob 6 is rotated the potentiometer $P_1$ delivers the necessary voltage to the current generating resistor $G_1$ and consequently the necessary current to point A in the system network. At this time it can be said that station 1 is now in economic balance with incremental cost potentiometer $C_T$ indicating incremental cost for the reference bus, station 1. The power of station 1 can now be read from the indicator 8.

The operator now goes to station 2, observes the nullmeter $N_2$ located between the variable tap of the potentiometer $C_2$ and the point 26 corresponding to station 2 bus in the system network. If the nullmeter indicator $N_2$ indicates that station 2 is not providing its share of the load, the operator then rotates the manual control knob 18 readjusting the potentiometer $P_2$ to a new level to supply the power through the current generator $G_2$ to the point 26. Adjustment is continued until nullmeter $N_2$ indicates a balance between the incremental worth of delivered power at station 2 represented by the potentiometer $C_2$ and the value required to be in balance with station 1. It is pointed out at this time that when the nullmeter $N_2$ is adjusted to a null position, the incremental cost of power delivered to the point 26 is balanced against the incremental worth of delivered power $C_2$ at station 2, and when this is referred through the loss resistors to point A, the cost of power delivered to point A by station 2 is the same as the cost of power delivery by station 1. Also, this is a first trial setting and will have to be adjusted after station 3 has been set.

The same procedure is followed with respect to station 3 in order to gain a null on the null indicator $N_3$ connected between the variable tap of the incremental worth of delivered power potentiometer $C_3$ associated with station 3, and the point 27 corresponding to station 3 bus.

Since the tie-point $TP_1$, is a fixed rate of cost per unit of power supplied or delivered, it is not necessary to determine the incremental worth of power in the setting of the potentiometer $P_T$ by the manual control knob 29. A power position of zero which is indicated by the indicator 30 is a position of zero power received or delivered through the tie-point $TP_1$. To control the power delivered or received, the operator merely adjusts the manual control knob 29 which moves the pointer of the power indicator 30 to the desired power position. The tap of the potentiometer $P_T$ also moves to a new position on the potentiometer $P_T$ since the parts are mechanically connected together by the mechanical link 31. The voltage supplied by the tap of the potentiometer $P_T$ is then applied to the current generator GT introducing a current at point 32 in the transmission system resistor network.

When this procedure has been followed in each of the stations and the tie-point $TP_1$, it must be repeated until all three nulls are zero simultaneously, then it is merely necessary to read the value of the power indicated by the power indicators 8, 17 and 21, in order to in turn adjust each of the stations 1, 2, and 3 in the actual power system to correspond with power settings indicated by this computer.

In order to provide automatic operation of the economic dispatch computer in FIGURE 1, it is merely necessary to provide several motors 33, 34 and 35 on the shafts 7, 15 and 19, respectively. The motors 33, 34 and 35 are provided with control amplifiers 36, 37 and 38, respectively, capable of receiving an output from across each of the null meters $N_1$, $N_2$ and $N_3$, $C_2$ and $C_3$ respectively, in order to drive the motors 33, 34 and 35, respectively in response to the positive or negative difference voltage indicated by each null meter. Any unbalance in the amplifier inputs indicating the difference voltages in the null meters will thus cause the motors to drive their associated station shafts in a direction and to a position of zero difference voltage presenting a null indication in the null indicators $N_1$, $N_2$ and $N_3$.

The circuit of FIGURE 2 also provides an automatic means for determining the incremental worth setting of $C_T$ for the system. This function is determined by the comparison of the total power desired for the system against the summation of the powers supplied by each of stations and the tie-point $TP_1$. In order to accomplish this, the shaft 2 of the incremental worth potentiometer CT is provided with the motor drive 43 controlled by a motor control summing amplifier 44. The motor control summing amplifier is provided with an input to the amplifier from a potentiometer 45 driven by a mechanical link 46 having a manual control knob 47 and a total power indicator 48. The potentiometer 45 is placed across a source of power 49 for developing a voltage across the potentiometer representative of the total power needed for the system. The operator knowing the total power or knowing the interchange of power, plus or minus between his system and other systems, indicating the needed power system adjustment, adjusts the manual control knob 47 positioning the pointer of the indicator 48 and the variable tap of the potentiometer 45 to the known total power or zero interchange power level. The potentiometer 45 then supplies a control voltage over the conductor 50 to the summing control amplifier 44.

The summing amplifier 44 is also provided with an input from each of the power potentiometers $P_1$ through $P_3$ of each of the stations 1 through 3 and a tie-point $TP_1$. For example, the voltage from the variable tap of potentiometer $P_1$ and supplied through the conductor 51 to the summing amplifier 44, similarly the conductors 52 and 53 supply the voltage references from the potentiometers $P_2$ and $P_3$ respectively, of stations 2 and 3 of the summing amplifier 44. In addition, the conductor 54 provides an input voltage to the summing amplifier 44 from the tie-point potentiometer $P_T$ which is also used to indicate the total power supplied or received from the tie-point $TP_1$. The voltages from the conductors 50 through 54 are then algebraically combined in the summing amplifier 44 and used to readjust the control motor 43 for the increment potentiometer $C_T$. Any readjustment of the potentiometer $C_T$ provides control signals to the amplifiers 36, 37 and 38 for controlling the motors 33, 34 and 35 to readjust the power settings of each of the stations in the system. This, in turn dictates a readjustment of the incremental cost potentiomeer $C_T$ through the motor 43, since the total value of power delivered to each of the stations is changed which in turn effects the summing amplifier 44 controlling the motor 43. This adjustment continues automatically until the total power deilvered by the stations and ties equals the total power indicated by the potentiometer 45. The system will then balance.

If it is desired to determine the worth of incremental delivered power at any of the station delivering points in the network, such as the point A, the point 26, or the point 27, as desired, the worth of incremental delivered power meter 55 connected between the point 56 of the incremental cost potentiometer group and the selected point can be used. This meter will then indicate the worth of incremental power delivered to the particular point being observed.

Although several embodiments of this invention have bten disclosed herein, it will be appreciated by those skilled in the art, that various modifications in the details of the computer herein disclosed, together with the organization of the components may be made without departing from the spirit and scope of the invention.

I claim as my invention:

1. An economic dispatch computer for a power distribution system involving a network connecting a plurality of stations comprising means for each station for producing a current proportional to the total power production of that station, means for each station for producing a voltage proportional to the incremental cost of said total power production of that station, impedance means proportional to the actual network resistances interconnecting said stations, said impedance means connected to said first mentioned means for providing voltage changes between stations proportional to the incremental losses in the network.

2. An economic dispatch computer for a power distribution system involving a network connecting a plurality of stations comprising means for each station for producing a current proportional to the total power production of that station, means for each station for producing a voltage proportional to the incremental cost of said total power production of that station, impedance means proportional to the actual network resistances interconnecting said stations, said impedance means connected to said first mentioned means for providing voltage changes between stations proportional to the incremental losses in the network for allowing all station incremental delivered power costs to be the same at a given reference point in said system.

3. An economic dispatch computer for a power distribution system involving a network connecting a plurality of stations comprising means for each station for producing a current proportional to the total power production of that station, means for each station for producing a voltage proportional to the incremental cost of said total power production of that station, impedance means proportional to the actual network resistances interconnecting said stations, said impedance means connected to said first mentioned means providing voltage changes between stations proportional to the incremental losses in the network for allowing all station incremental delivered power costs to be the same at a given reference point in said system, totalizing circuit means for connecting said first mentioned means for each station together to provide total power indication output for the system.

4. An economic dispatch computer for a power distribution system involving a network connecting a plurality of stations comprising means for each station for producing a current proportional to the total power production of that station, means for each station for producing a voltage proportional to the incremental cost of said total power production of that station, impedance means proportional to the actual network resistances interconnecting said stations, said impedance means connected to said first mentioned means providing voltage changes between stations proportional to the incremental losses in the network for allowing all station incremental delivered power costs to be the same at a given reference point in said system, totalizing circuit means for connecting said first mentioned means for each station together to provide total power indication output for the system, and total power selecting means for establishing a desired total power output for said system.

5. An economic dispatch computer for a power distribution system involving a network connecting a plurality of stations comprising means for each station for producing a current proportional to the total power production of that station, means for each station for producing a voltage proportional to the incremental cost of said total power production of that station, impedance means proportional to the actual network resistances interconnecting said stations, said impedance means connected to said first mentioned means providing voltage changes between stations proportional to the incremental losses in the network for allowing all station incremental delivered power costs to be the same at a given reference point in said system, totalizing circuit means for connecting said first mentioned means for each station together to provide total power indication output for the system, total power selecting means for establishing a desired total power output for said system, and control means for comparing said total power selecting means and said totalizing circuit means, said control means being capable of causing each said first mentioned means for each station to readjust to a selected total power selecting means.

References Cited in the file of this patent

UNITED STATES PATENTS

| | | |
|---|---|---|
| 2,650,760 | Bills | Sept. 1, 1953 |
| 2,829,829 | Starr et al. | Apr. 8, 1958 |
| 2,836,730 | Early | May 27, 1958 |
| 2,836,731 | Miller | May 27, 1958 |
| 2,962,598 | Larew et al. | Nov. 29, 1960 |

OTHER REFERENCES

Brownlee: Coordination of Incremental Fuel Costs, AIEE Trans., part III, A vol. 73, June 1954, pp. 523–533.